United States Patent [19]

Winberg et al.

[11] 4,079,830

[45] Mar. 21, 1978

[54] CYLINDER ORIENTER

[75] Inventors: Paul N. Winberg, Fayetteville; William J. Weber, Fulton, both of N.Y.

[73] Assignee: Lipe Rollway Corporation, Liverpool, N.Y.

[21] Appl. No.: 730,130

[22] Filed: Oct. 6, 1976

[51] Int. Cl.² ............................................ B65G 47/24
[52] U.S. Cl. ..................................... 198/391; 193/46; 221/171
[58] Field of Search .............. 198/389, 390, 391, 392, 198/396, 410, 443; 193/44, 46, 47, 48; 221/159, 171

[56] References Cited

U.S. PATENT DOCUMENTS

| | | | |
|---|---|---|---|
| 2,377,409 | 6/1945 | Edelman et al. | 193/46 |
| 2,767,881 | 10/1956 | Gruenberg | 193/46 |
| 2,798,585 | 7/1957 | Bailey et al. | 198/391 |
| 2,956,665 | 10/1960 | Arlin | 198/443 |
| 3,063,543 | 11/1962 | Schneider | 198/389 |
| 3,224,553 | 12/1965 | Campbell | 198/396 |
| 3,623,594 | 11/1971 | Ravn et al. | 198/396 |
| 3,630,393 | 12/1971 | Yamamuro | 221/171 |
| 3,650,367 | 3/1972 | Mead | 198/391 |
| 3,841,471 | 10/1974 | Mead | 198/755 |
| 3,939,966 | 2/1976 | Szenczy | 198/391 |

Primary Examiner—Johnny D. Cherry
Assistant Examiner—Richard K. Thomson
Attorney, Agent, or Firm—Stonebraker, Shepard & Stephens

[57] ABSTRACT

The inventive orienter is used in the output path of a vibratory feeder for axially orienting uniform cylinders. It includes a tube having a side opening spaced from the input end and extending axially along a portion of the tube so cylinders that are not axially oriented fall through the side opening and down to a lower region of the feeder. The tube is rotationally oriented for positioning the lower edge of the side opening relative to a vertical plane through the axis of the tube so that the axially oriented cylinders move along the tube while overhanging the lower edge, and cylinders not axially oriented slide toward the bottom of the tube and fall over the lower edge and through the side opening. The tube preferably has a top opening at the input end, and the top opening preferably overlaps with the side opening so that relatively tall cylinders can enter the input end of the tube standing up and be rejected when they enter the side opening region. The orienter also preferably includes an adjustable inclined ramp for toppling the cylinders into the input end of the tube to facilitate axial orientation of relatively short cylinders.

21 Claims, 5 Drawing Figures

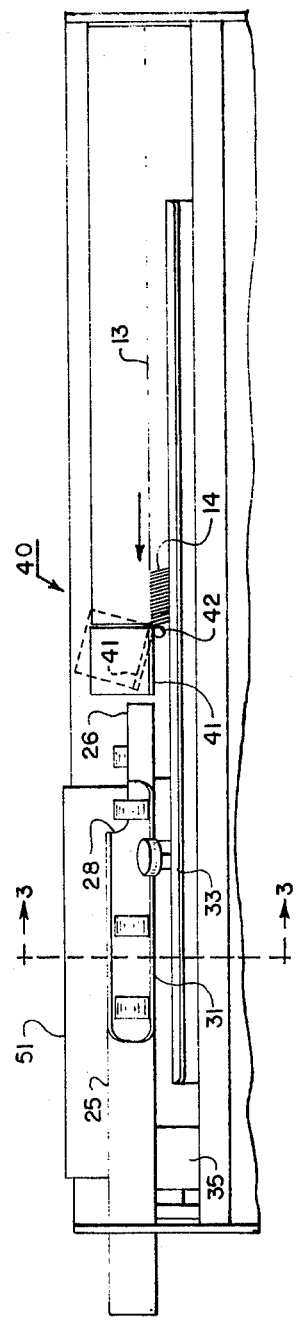
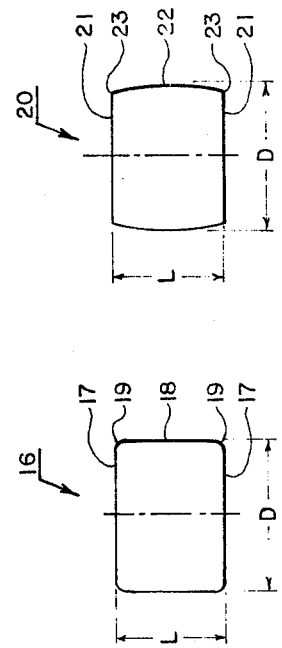
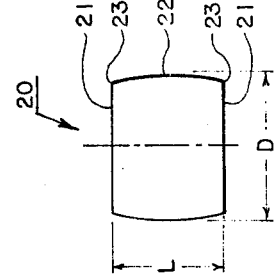
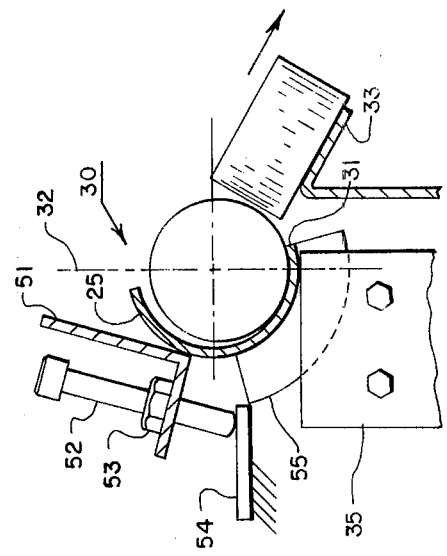

CYLINDER ORIENTER

BACKGROUND OF THE INVENTION

Axial orientation of cylinders in end-to-end axial alignment is frequently required during the manufacture of roller bearings, and a great need exists for fast and reliable orienters capable of axially orienting cylinders of various dimensions. Cylinders having a length-to-diameter (L/D) ratio of substantially more than one are relatively easy to orient axially, bacause if they are upright or lateral to the direction of flow, they can be respectively tipped over by a wiper or toppled over an edge to leave only axially oriented cylinders in the output flow. As the L/D ratio decreases toward unity to result in "square" cylinders having approximately equal lengths and diameters, axial orientation becomes more difficult. U.S. Pat. No. 3,939,966 suggests an orienter that is very successful with "square" cylinders, but a different orienter is required for cylinders having an L/D ratio of less than one.

The invention aims at orienting cylinders having an L/D ratio of less than one in a simple, efficient, and reliable way, and actually results in a device that is successful at orienting cylinders having any L/D ratio of 0.5 or more. The invention aims at speed, reliability, and versatility in axially orienting cylinders having a broad range of proportions and L/D ratios.

SUMMARY OF THE INVENTION

The inventive orienter applies to a vibratory feeder having an output path above a lower region, and the orienter is arranged in the output path for axially orienting uniform cylinders. The orienter is formed as a tube having a somewhat larger inside diameter than the diameter of the cylinders, and the tube is arranged to receive the cylinders at any orientation in an input end of the tube for movement through the tube. The tube has a side opening spaced from the input end and extending axially along a portion of the tube, and the side opening is sized and oriented so that the cylinders that are not axially oriented fall through the side opening and down to the lower region. The tube is rotationally oriented for positioning the lower edge of the side opening relative to a vertical plane through the axis of the tube so that the axially oriented cylinders move along the tube while overhanging the lower edge without falling through the side opening and cylinders not axially oriented fall through the side opening over the lower edge and down to the lower region.

The tube preferably has a top opening extending partway back from the input end and overlapping with the side opening, which preferably extends radially for about 180° to 270°. The axis of the tube is preferably aligned with the plane of the vibration motion of the feeder in the output path, and the lower edge of the side opening is preferably from 5° to 15° from the vertical plane through the axis of the tube. An adjustable incline is preferably arranged just upstream of the input end of the tube for toppling the cylinders into the input end of the tube.

DRAWINGS

FIG. 2 is a cross-sectional view of the orienter of FIG. 1 taken along the line 2—2 thereof;

FIG. 3 is a cross-sectional view of the orienter of FIG. 2 taken along the line 3—3 thereof; and FIGS. 4 and 5 are side elevational views of two forms of cylinders orientable by the inventive orienter.

DETAILED DESCRIPTION

Figure 1:
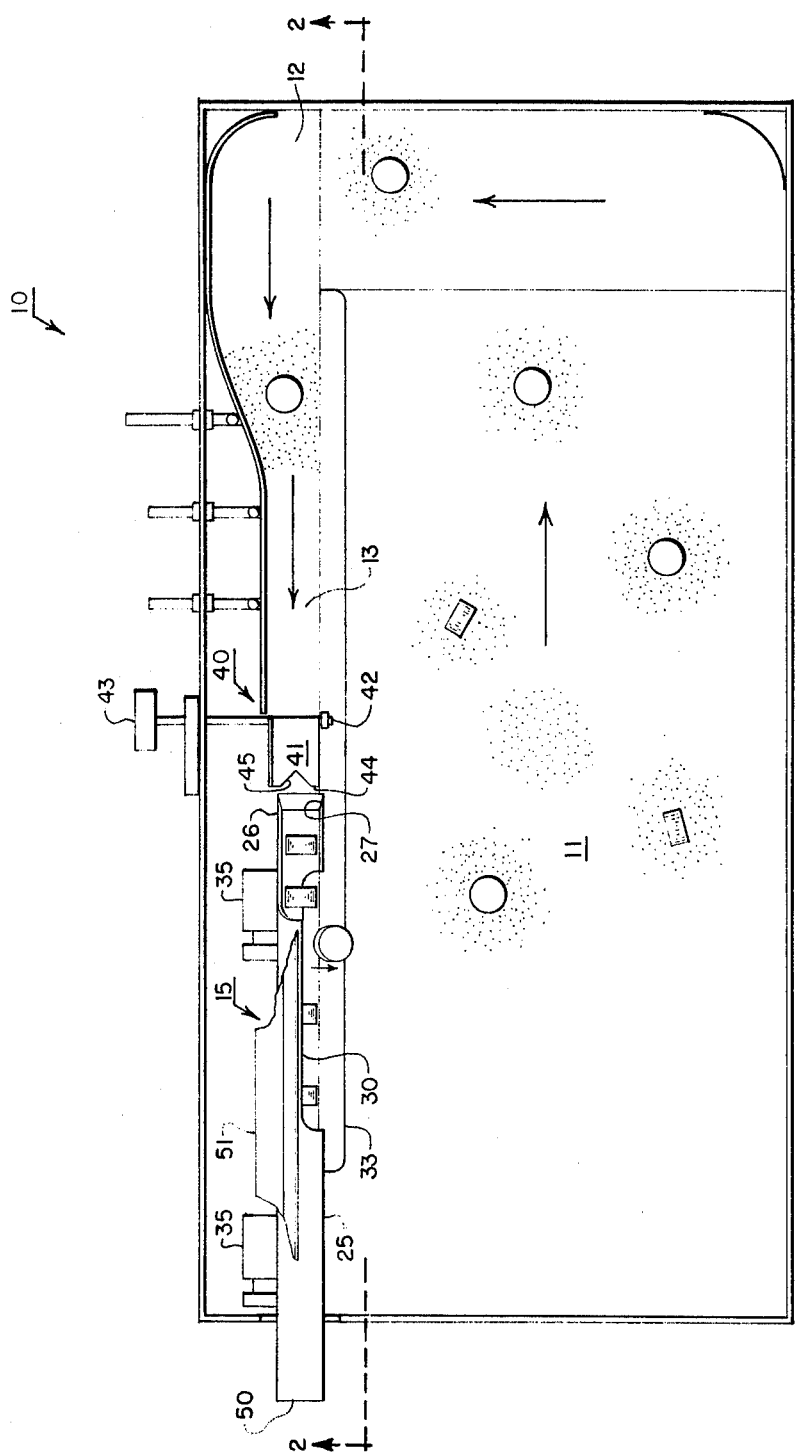
FIG. 1 is a partially schematic, and partially cut-away plan view of a vibratory feeder having a preferred embodiment of the inventive orienter.

Feeder 10 is a generally known vibratory feeder having a lower level 11, a turn 12, and an output path 13, and it feeds cylinders from lower input level 11 up and around turn 12 and along output path 13. The inventive orienter 15 is arranged in output path 13 for accepting cylinders oriented in axial end-to-end alignment and for rejecting and returning to lower level 11 all cylinders that are not axially oriented.

Feeder 10 uses a pile material 14 best shown in FIG. 2 for moving the cylinders along as the feeder vibrates, and the general direction or plane of vibrational motion and the direction of cylinder flow along output path 13 are both indicated by the arrows in FIGS. 1 and 2 as aligned with the axis of orienter 15. The inventive orienter can also be applied to feeders that do not use a vibrated pile material, and to bowl or other vibrational feeders having configurations different from the illustrated feeder 10.

The inventive orienter was developed for axially orienting cylinders having a length-to-diameter (L/D) ratio of less than one, but it solves this problem in a way that also orients cylinders having larger L/D ratios. The invention is illustrated relative to orienting cylinders having an L/D ratio of less than one, because that is the more difficult case, but the inventive orienter is successful at orienting cylinders having any L/D ratio of 0.5 or larger.

Two common examples of axially orientable cylinders having L/D ratios of less than one are illustrated in FIGS. 4 and 5. Cylinder 16 of FIG. 4 has flat or nearly flat end regions 17, a right circular cylindrical midregion 18, and radiused portions 19 joining ends 17 with midregion 18. Cylinder 20 of FIG. 5 has flat or nearly flat end regions 21, a midregion 22 ground to a relatively large spherical radius, and a small radiused portion 23 where flat end regions 21 join spherical midregion 22. Cylinders 16 and 20 each have a maximum diameter indicated by "D", and an axial length indicated by "L". The ratio of the length L to the diameter D can range upward from about 0.5 to as large a ratio number as is practical for axial orientation of cylinders.

Throughout this application, the word "cylinders" refers to either type of cylinder shown in FIGS. 4 and 5, regardless of L/D ratio, and to other generally cylindrical shapes, and "axial orientation" or "axially oriented" refers to axial end-to-end alignment of a series of such cylinders for output from a vibratory feeder. The most common use for such cylinders is roller bearings, although the invention is not limited to orienting roller bearings.

Orienter 15 is formed from a tube 25 arranged in output path 13 in axial alignment with the direction of flow of the cylinders, and preferably in axial alignment with the vertical plane of the vibrational motion of feeder 10 along output path 13. The input end 26 of tube 25 preferably has an internal bevel 27 to facilitate receiving cylinders, and tube 25 also has a top opening 28 extending axially inward from end region 26. For cylinders having an L/D ratio of about one or less, top opening 28 allows for bouncing or change of orientation of the cylinders as they enter the end region 26 of tube 25. For cylinders having an L/D ratio of more than one, top opening 28 allows cylinders to enter tube 25 in an upright or standing position. Tube 25 also has an inside diameter somewhat larger than the diameter D of the cylinders being oriented. In practice, several different sizes of cylinders having several different diameters can be oriented by a single tube 25 having an inside diameter somewhat larger than the largest diameter encountered for the cylinders to be oriented. Tube 25 is preferably mounted to vibrate with feeder 10 in a direction of vibrational motion aligned with the axis of tube 25 in output path 13, but tube 25 can be stationary.

Tube 25 has a side opening 30 spaced from input end 26 and extending axially for a distance along tube 25. Side opening 30 preferably extends radially for about 180° to 270° around tube 25 and is preferably formed by cutting away about one-half of tube 25. Side opening 30 can also extend radially a little less than 180° if desired, so long as side opening 30 is large enough so that improperly oriented cylinders can fall freely through side opening 30. Side opening 30 also preferably terminates a substantial distance upsteam of the output end 50 of tube 25 so that the region of tube 25 near output end 50 is preferably a radially closed tube containing only axially oriented cylinders.

Side opening 30 and top opening 28 preferably overlap as illustrated so that top opening 28 extends downstream beyond the upstream end of side opening 30. This is especially important for orienting cylinders having an L/D ratio of more than one, because some of such cylinders may enter tube 25 standing upright on one end and extending upward through top opening 28, and such cylinders are rejected or toppled out of side opening 30. The overlap with top opening 28 allows upright cylinders to move to the downstream end of top opening 28, where they enter side opening 30 and are rejected. Such longer cylinders having an L/D ratio of more than one can also be tipped over to facilitate axial orientation by wiper devices upstream of tube 25.

Side opening 30 has a lower edge 31 also extending axially along tube 25, and the inside surface of tube 25 adjacent lower edge 31 supports axially oriented cylinders and rejects cylinders that are not axially oriented. As best shown in FIG. 3, lower edge 31 is preferably positioned a few degrees beyond bottom center for securely supporting axially oriented cylinders. More specifically, tube 25 is rotationally oriented for properly positioning lower edge 31 of side opening 30 relative to a vertical plane 32 passing through the axis of tube 25 so that edge 31 is a few degrees toward the side of tube 25 that opens outward in side opening 30. Cylinders that are not axially oriented tend to slide downward over lower edge 31, fall through side opening 30, skid over plate 33, and drop to lower region 11. Lower edge 31 is preferably positioned from about 5° to 15° toward plate 33 from vertical plane 32 through the axis of tube 25, and tube 25 is preferably rotationally adjustable for proper positioning of lower edge 31 for orienting different cylinders or for different operating conditions.

Lower edge 31 of side opening 30 is generally linear when side opening 30 is formed in the preferred way by cutting away about one-half of tube 25. Lower edge 31 can also be notched or scalloped or have other non-linear configurations that aid in rejecting cylinders that are not axially oriented. Any periodic deviation from the linear in lower edge 31 preferably occurs at intervals of less than the length L of the cylinders to be oriented so that axially oriented cylinders can pass along the length of lower edge 31 without being rejected.

Clamps 35 are shown schematically for holding tube 25 in proper rotational orientation on feeder 10, and a variety of clamping devices can be used for holding tube 25 in the proper position. Clamps 35 should hold tube 25 securely in place and also allow easy rotational adjustment of tube 25 for tuning orienter 15 to a particular size or shape of cylinder under particular operating conditions.

In addition to clamps 35, tube 25 preferably includes a rotational orientation adjusting device to aid in setting lower edge 31 of side opening 30 to the proper position relative to vertical plane 32. One way to accomplish this is by an angle piece 51 secured to the wall of tube 25 and having adjusting screws 52 threaded through angle piece 51 and provided with lock nuts 53 as best shown in FIG. 3 for screwing against an abutment 54 for angularly or rotationally adjusting the orientation of side opening 30 of tube 25. To adjust tube 25, clamp 35 is loosened to release its grip on collar 55 on tube 25, lock nuts 53 are loosened on screws 52, and screws 52 are turned to set the desired angle between abutment 54 and angle piece 51, which in turn establishes the angular orientation of lower edge 31 of side opening 30. When the rotational orientation of tube 25 is satisfactory, lock nut 53 is turned to lock screws 52 in place, clamps 35 are reset to grip collars 55, and orienter 15 is ready for operation. One advantage in setting the angular orientation of tube 25 by screws 52 is that tube 25 can be removed, replaced by another tube having a different diameter, and then later replaced without losing its rotational orientation. This allows an assortment of different diameter tubes to be maintained all with a preset rotational adjustment and ready for operation for easy and rapid interchange of tubes to adjust the feeder to different size cylinders.

Cylinders having an L/D ratio less than one are more inclined to rest on a flat end surface than on their cylindrical surface, so that more than half of the cylinders may be rejected by orienter 15. To increase the output rate for such cylinders it is preferred to position more than half of the cylinders in the proper axial orientation as they enter input end 26 of tube 25, and to facilitate this, a toppler 40 is preferred. Toppler 40 is preferably arranged just upstream of the input end 26 of tube 25, and is formed as a ramp 41 adjustable in its inclination by a pivotal mounting on pin 42 for inclination adjustment via a knob 43. Also, the output end 44 of inclined ramp 41 preferably has a notch shape 45 to help maintain the axial orientation of cylinders already axially oriented, and to help topple cylinders resting on their flat ends into an axial orientation as they drop into input end 26 of tube 25. Ramp 41 is preferably adjusted in inclination to vary the level of output end 44 for optimum toppling of cylinders into input end 26 of tube 25 so that the largest possible percentage of cylinders is axially oriented as they enter tube 25. Toppler 40 also provides a pressure break relieving cylinders from pressure from upstream cylinders and thus helping them move to the desired axial orientation. For cylinders having an L/D ratio of more than one, toppler 40 is preferably inclined only enough to provide the desired pressure break between cylinders, and not enough to topple cylinders that are already likely to be resting on a cylindrical surface.

Feeder 10 is preferably tuned to produce minimal transverse vibration so that cylinders proceeding along tube 25 are subject to vibrational motion axially of tube 25, but very little vibration sideways of tube 25. This allows lower edge 31 of side opening 30 to be set fairly close to the vertical axial plane 32 for reliable discrimination between axially oriented cylinders and cylinders that are not axially oriented. When the inventive orienter is applied to vibratory bowl feeders having a substantial centrifugal component of vibration, lower edge 31 of side opening 30 can be placed on the other side of the vertical axial plane 32 for supporting axially oriented cylinders in cooperation with the centrifugal vibrational component. Also, if the vibratory feeder unavoidably produces a vibrational component sideways relative to tube 25, lower edge 31 of side opening 30 is adjusted accordingly so as to retain axially oriented cylinders and reject cylinders that are not axially oriented.

Those skilled in the art will understand ways of applying the inventive orienter to various feeders for orienting cylinders of various sizes and configurations, once the principles of the invention are understood. They will also know how to make the inventive orienter in a variety of sizes and configurations, and to hold, clamp, and adjust it in a variety of satisfactory ways.

What is claimed is:

1. In a vibratory feeder having an output path above a lower region, an orienter arranged in said output path for axially orienting uniform cylinders, said orienter comprising:
   a. a generally cylindrical tube have a somewhat larger inside diameter than the diameter of said cylinders;
   b. said tube being arranged to receive said cylinders at any orientation in an input end of said tube for movement through said tube;
   c. said tube being mounted to be generally horizontal and driven vibrationally with said output path for advancing said cylinders along the axial length of said tube without forcing said cylinders tightly together;
   d. said tube having a side opening spaced from said input end and extending axially along a portion of said tube, said side opening being sized and oriented so that ones of said cylinders that are not axially oriented fall through said side opening and down to said lower region;
   e. said side opening having a lower edge;
   f. said tube wall curving upward from said lower edge to provide a surface that inclines increasingly upward with distance from said lower edge; and
   g. means for rotationally orienting said tube for positioning said lower edge of said side opening relative to a vertical plane through the axis of said tube so that said axially oriented cylinders move along said tube supported by a bottom region of said tube adjacent said lower edge while overhanging said lower edge without falling through said side opening and cylinders not axially oriented engage said increasingly upwardly inclined surface above said bottom region and thereby fall through said side opening over said lower edge and down to said lower region.

2. The orienter of claim 1 wherein said side opening has a radial extent of about 180° to 270°.

3. The orienter of claim 1 wherein said tube has a top opening extending partway along said tube from said input end of said tube to facilitate receiving said cylinders.

4. The orienter of claim 3 wherein said input end of said tube has an internal bevel.

5. The orienter of claim 3 wherein said top opening extends into the region of said side opening to overlap with said side opening.

6. The orienter of claim 1 wherein said lower edge of said side opening is generally linear.

7. The orienter of claim 1 wherein said side opening terminates substantially upstream of an output end of said tube.

8. The orienter of claim 1 wherein said axis of said tube is substantially aligned with the direction of the vibration motion of said feeder in said output path.

9. The orienter of claim 8 wherein said lower edge of said side opening is from 5° to 15° from said vertical plane.

10. The orienter of claim 9 wherein said lower edge of said side opening is generally linear.

11. The orienter of claim 1 including an adjustable incline just upstream of said input end of said tube and arranged for forcing said cylinders to move upward from the level of said bottom region of said tube to a level above said bottom region of said tube for toppling said cylinders over an upper end of said incline and into said input end of said tube.

12. The orienter of claim 11 wherein said upper end of said incline is notch shaped to facilitate said axial orientation of said cylinders as said cylinders topple into said tube.

13. The orienter of claim 11 wherein said tube has a top opening extending partway along said tube from said input end of said tube to facilitate receiving said cylinders.

14. The orienter of claim 13 wherein said top opening extends into the region of said side opening to overlap with said side opening.

15. The orienter of claim 11 wherein said axis of said tube is substantially aligned with the direction of the vibration motion of said feeder in said output path.

16. The orienter of claim 15 wherein said lower edge of said side opening is generally linear and from 5° to 15° from said verticial plane.

17. The orienter of claim 16 wherein said side opening terminates substantially upstream of an output end of said tube.

18. The orienter of claim 15 wherein said tube has a top opening extending partway along said tube from said input end of said tube to facilitate receiving said cylinders and said side opening terminates substantially upstream of an output end of said tube.

19. The orienter of claim 18 wherein said top opening extends into the region of said side opening to overlap with said side opening.

20. The orienter of claim 19 wherein said lower edge of said side opening is generally linear and from 5° to 15° from said vertical plane.

21. The orienter of claim 20 wherein said upper end of said incline is notch shaped to facilitate said axial orientation of said cylinders as said cylinders topple into said tube.

* * * * *